United States Patent
Lin et al.

(10) Patent No.: US 7,355,588 B2
(45) Date of Patent: Apr. 8, 2008

(54) LIGHT CONTROL MODULE AND METHOD THEREOF

(75) Inventors: Chun-Huang Lin, Hsinchu (TW); Jeng-Feng Lan, Hsinchu (TW)

(73) Assignee: PixArt Imaging Inc., Hsin-Chu (TW)

( * ) Notice: Subject to any disclaimer, the term of this patent is extended or adjusted under 35 U.S.C. 154(b) by 562 days.

(21) Appl. No.: 11/005,454

(22) Filed: Dec. 6, 2004

(65) Prior Publication Data
US 2005/0168444 A1 Aug. 4, 2005

(30) Foreign Application Priority Data
Feb. 3, 2004 (TW) ............................... 93102366 A

(51) Int. Cl.
*G09G 5/08* (2006.01)
(52) U.S. Cl. ..................................... 345/166
(58) Field of Classification Search ................ 345/166
See application file for complete search history.

(56) References Cited

U.S. PATENT DOCUMENTS

| | | | | |
|---|---|---|---|---|
| 4,364,035 A | * | 12/1982 | Kirsch | 345/166 |
| 4,558,933 A | * | 12/1985 | Murr | 351/226 |
| 4,751,505 A | * | 6/1988 | Williams et al. | 345/166 |
| 5,060,309 A | * | 10/1991 | Narita | 398/202 |
| 5,994,710 A | * | 11/1999 | Knee et al. | 250/557 |
| 6,172,354 B1 | * | 1/2001 | Adan et al. | 250/221 |
| 6,455,840 B1 | * | 9/2002 | Oliver et al. | 250/222.1 |
| 6,618,038 B1 | * | 9/2003 | Bohn | 345/164 |
| 6,657,184 B2 | * | 12/2003 | Anderson et al. | 250/221 |
| 6,703,599 B1 | * | 3/2004 | Casebolt et al. | 250/221 |
| 6,795,056 B2 | * | 9/2004 | Norskog et al. | 345/158 |
| 6,995,748 B2 | * | 2/2006 | Gordon et al. | 345/166 |
| 2002/0035701 A1 | * | 3/2002 | Casebolt et al. | 713/300 |
| 2004/0130532 A1 | * | 7/2004 | Gordon et al. | 345/166 |
| 2005/0104853 A1 | * | 5/2005 | Sitalasai et al. | 345/163 |
| 2005/0162391 A1 | * | 7/2005 | Lin | 345/163 |
| 2005/0206613 A1 | * | 9/2005 | Chan et al. | 345/156 |

* cited by examiner

Primary Examiner—Amare Mengistu
Assistant Examiner—Eli M Sheets
(74) Attorney, Agent, or Firm—Tung & Associates

(57) ABSTRACT

A light control module appropriate for an optical pointing device. The light control module comprises a processing unit outputting a first signal and a second signal, a photo sensor unit executing a capture operation according to an impulse of the first signal, and a light emitting unit executing a light emitting operation according to an impulse of the second signal, wherein when a frequency value of the first signal is less than a first preset value, at least one impulse is inserted between two successive impulses of the second signal for adjusting a frequency value of the second signal such that an equivalent frequency value corresponding to any two successive impulses of the second signal is greater than a second preset value, thus rendering flickers of the light emitting unit imperceptible.

10 Claims, 5 Drawing Sheets

LIGHT CONTROL MODULE AND METHOD THEREOF

BACKGROUND OF THE INVENTION

1. Field of the Invention

The present invention relates to a light control module and method thereof, and in particular to a light control module and method appropriate for an optical pointing device.

2. Description of the Related Art

A mouse is a commonly used input device. A wheel mouse processes a displacement signal, a button signal, and an interface signal and communicates with a computer via an interface using the mechanical structure of its wheel and a micro-controller chip. An optical mouse replaces the mechanical structure of the wheel mouse with a complementary metal oxide semiconductor (CMOS) photo sensor chip capable of optical navigation. The CMOS photo sensor senses a series of continuous images of an operating surface. The displacement of the optical mouse can be determined by processing the images.

Typically, an optical mouse requires an auxiliary light source, such as a Light Emitting Diode (LED), supplying sufficient brightness for CMOS photo sensor operation. The LED flashes each time the CMOS photo sensor captures an image. Therefore, the auxiliary light source must provide sufficient and continuous brightness when the CMOS photo sensor captures a series of continuous images of the operating surface.

In practice, the auxiliary light source operates in accordance with a capture frequency of the CMOS photo sensor, to reduce power consumption and extend life. Thus, the auxiliary light source turns on when the CMOS photo sensor captures an image and turns off when the CMOS photo sensor is idle. When the auxiliary light source operates in accordance with a very low frequency CMOS photo sensor, flickers generated thereby are apparent and may cause discomfort for a user.

FIG. 1a is a diagram of the conventional optical mouse 1. FIG. 1b is a diagram of the under side of the optical mouse 1 in FIG. 1a. As shown in FIG. 1b, the optical mouse 1 has a photo sensor area 2 on the under side thereof for placement on an operating surface, such as a desktop. The photo sensor determines a displacement of the optical mouse 1 on the operating surface. FIG. 2 is a diagram showing operation of the photo sensor area 2 of the conventional optical mouse 1. As shown in FIG. 2, the optical mouse 1 comprises a photo sensor 3 and a light emitting diode (LED) 4. When the optical mouse 1 is moved on the operating surface 6, the LED 4 emits a beam 5 which is reflected by the operating surface 6 to the photo sensor 3, thus improving brightness for the photo sensor 3.

Typically, the LED 4 operates in coordination with the photo sensor 3. Thus, the LED emits light each time the photo sensor 3 executes a capture operation. When the optical mouse 1 is in a normal mode, for example being moved, the photo sensor 3 and the LED 4 both operate at a high frequency of 1500 Hz. When the optical mouse is in a standby mode, however, for example, when idle for some duration, the photo sensor 3 operates at a capture frequency of 30 Hz to reduce power consumption. Accordingly, the LED 4 also operates at a light emitting frequency of 30 Hz.

Typically, flickers from a light source are imperceptible when the frequency of the light source is greater than 60 Hz. However, as described above, when the conventional optical mouse 1 is in the standby mode, the photo sensor operates at the capture frequency of 30 Hz, and the LED 4 operates at the light emitting frequency of 30 Hz accordingly. Therefore, flickers from the LED 4 are apparent and may cause discomfort for a user.

SUMMARY OF THE INVENTION

Accordingly, an object of the present invention is to provide a light control module appropriate for an optical pointing device. When a photo sensor unit of the optical pointing device operates at a low frequency, the frequency of a light emitting unit of the optical pointing device can be adjusted accordingly, thus avoiding perceptible flickers, reducing power consumption, and prolonging life of the light emitting unit.

The present invention provides a light control module, appropriate for an optical pointing device, comprising a processing unit outputting a first signal and a second signal, a photo sensor unit executing a capture operation according to an impulse of the first signal, and a light emitting unit emitting light according to an impulse of the second signal, wherein when a frequency value of the first signal is less than a first preset value, at least one impulse is inserted between two successive impulses of the second signal for adjusting a frequency value of the second signal such that an equivalent frequency value corresponding to any two successive impulses of the second signal is greater than a second preset value, thus preventing the light emitting unit from flickering.

The present invention also provides a light control method comprising the steps of outputting a first signal and a second signal, executing a capture operation according to an impulse of the first signal, executing a light emitting operation according to an impulse of the second signal, determining whether a frequency value of the first signal is less than a first preset value, and if so, inserting at least one impulse between two successive impulses of the second signal for adjusting a frequency value of the second signal such that an equivalent frequency value corresponding to any two successive impulses of the second signal is greater than a second preset value, thus preventing the light emitting unit from flickering.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1b is a diagram of the under side of the optical mouse in FIG. 1a.

DETAILED DESCRIPTION OF THE INVENTION

First Embodiment

Figure 1A:
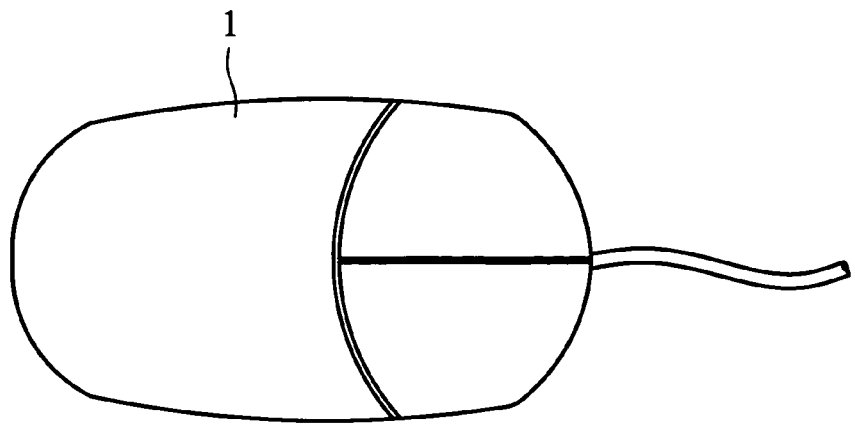
FIG. 1a is a diagram of the conventional optical mouse.
Figure 1B:
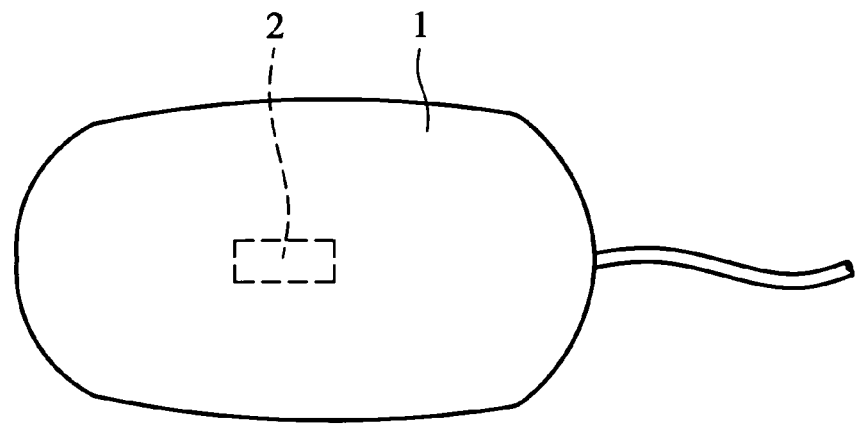
Figure 2:
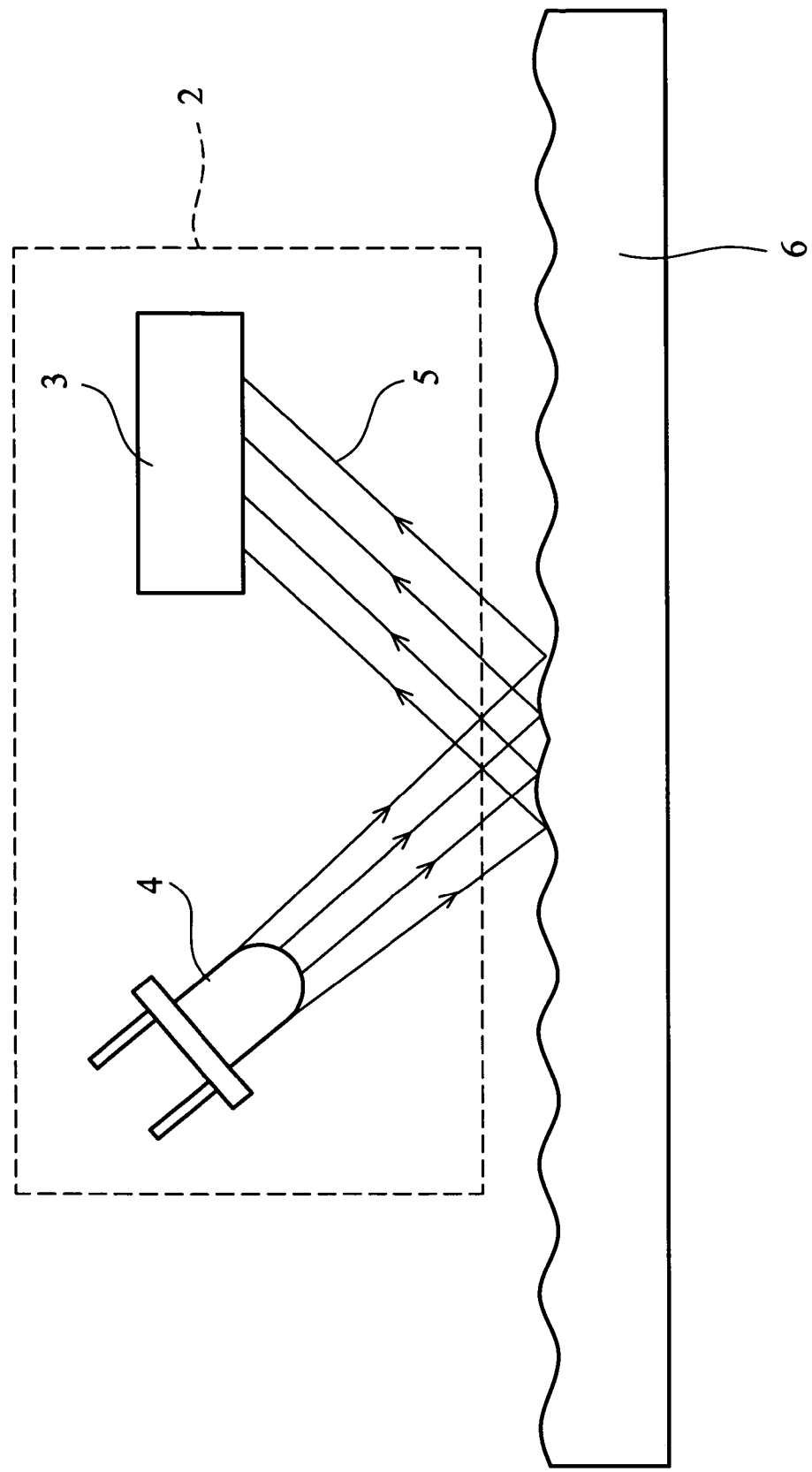
FIG. 2 is a diagram showing operations in the photo sensing area of the conventional optical mouse.
Figure 3:
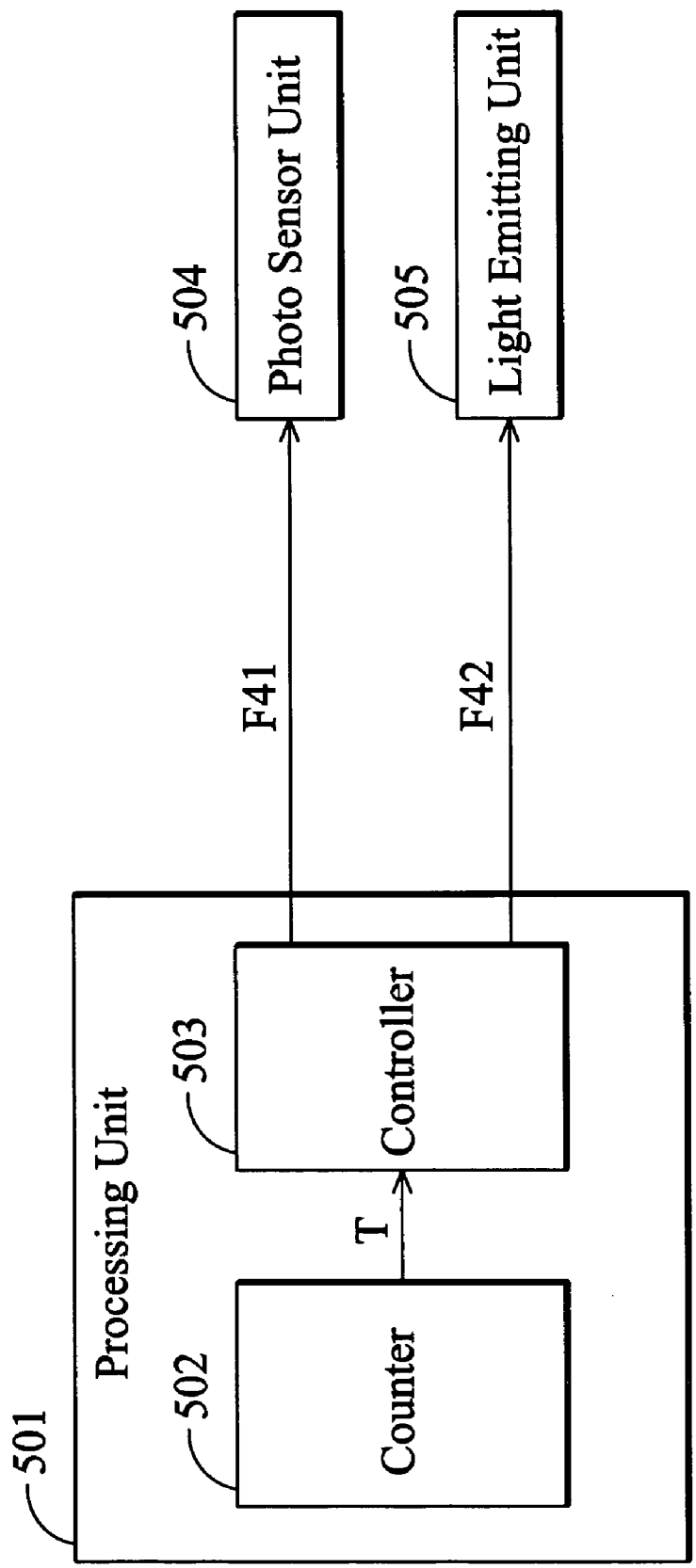
FIG. 3 is a schematic diagram of circuits of the light control module of the optical mouse of the present invention.

FIG. 3 is a schematic diagram of circuits of the light control module of the optical mouse of the present invention. The optical mouse comprises a processing unit 501, a photo sensor unit 504, and a light emitting unit 505. The light emitting unit 505 is an LED. The processing unit 501 comprises a counter 502 and a controller 503. The counter 502 sequentially generates counting numbers T for transmission to the controller 503. The counting numbers T are increased from 0 to 3000 by increments of 1 in one second for use as a time division standard.

The controller 503 generates a capture signal F41 and a light emitting signal F42 according to two selected sets of counting numbers respectively. The capture signal F41 and the light emitting signal F42 are output to the photo sensor unit 504 and the light-emitting unit 505 respectively. When a counting number presently generated by the counter 502 belongs to the selected set of counting numbers, the controller 503 outputs one impulse. The photo sensor unit 504 executes at least one capture operation according to the impulse of the capture signal F41. Similarly, the light emitting unit 505 executes a light emitting operation according to the impulse of the light emitting signal F42. Because the light emitting unit 505 operates in coordination with the photo sensor unit 504, the selected set of counting numbers for the light emitting signal F42 must comprise all numbers in the selected set of counting numbers for the capture signal F41, such that the light emitting unit 505 executes the light emitting operation each time when the photo sensor unit 504 executes the capture operation.

Figure 4:
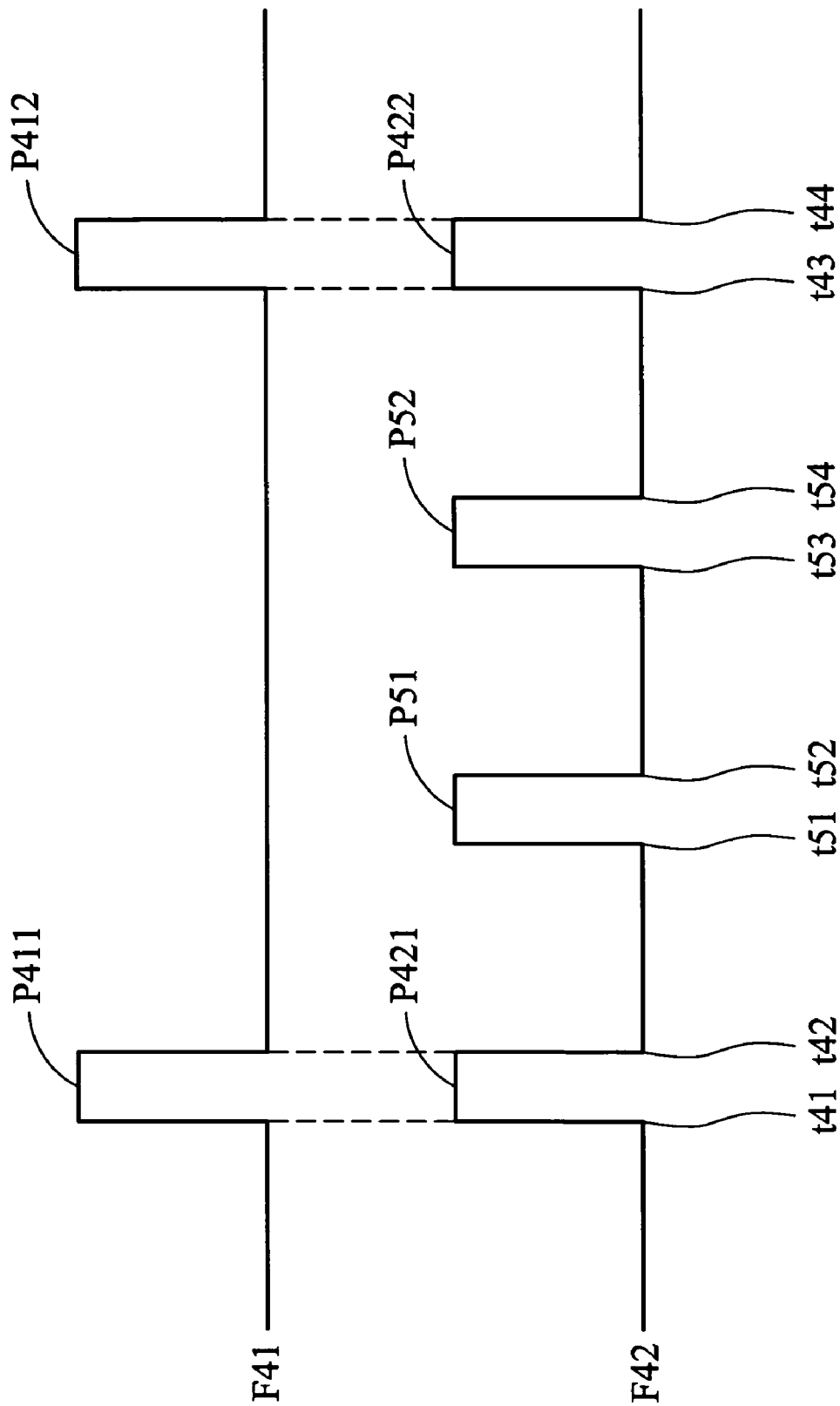
FIG. 4 is a wave diagram showing the impulses according to which the photo sensor unit and the light emitting unit (Light Emitting Diode, LED) work when the photo sensor unit of the optical mouse of the present invention operates at a low frequency in a low power mode.

When the optical mouse is in a normal mode, for example being moved, the two selected sets of counting numbers comprise the same numbers. Thus, the capture signal F41 and the light emitting signal F42 have the same frequency value. Therefore, it is guaranteed that the light emitting unit 505 executes the light emitting operation each time when the photo sensor unit 504 executes the capture operation. In this embodiment, the counting numbers T are increased from 0 to 3000 by increments of 1 in one second. Each selected set of counting numbers is determined by selecting all multiples of 2, so the photo sensor unit 504 and the light emitting unit 505 both operate at a high frequency of 1500 Hz FIG. 4 is a wave diagram showing the impulses according to which the photo sensor unit 504 and the light emitting unit (Light Emitting Diode, LED) 505 work when the photo sensor unit 504 of the optical mouse of the present invention operates at a low frequency in a low power mode. When the optical mouse is in a standby mode, for example, when idle for some duration, the two selected sets of counting numbers comprise different numbers. The selected set of counting numbers for the capture signal F41 is determined so as to decrease the frequency of the capture signal F41 to be 30 Hz for reducing power consumption As shown by the upper wave in FIG. 4, the counting numbers T corresponding to the capture signal F41 are t41 (100), t42 (120), t43 (200), and t44 (220). As described above, the light emitting unit 505 must operate in coordination with the photo sensor unit 504, thus the counting numbers T corresponding to the capture signal F41, t41, t42, t43, and t44, are also used to generate the light emitting signal F42. For convenience, counting numbers t41, t42, t43, and t44 are referred to hereinafter as original counting numbers for the light emitting signal F42.

When the controller 503 detects that the frequency of the capture signal F41 is less than a first preset value of 60 Hz, the controller 503 inserts two impulses P51 and P52 between two successive impulses P421 and P422 of the light emitting signal F42. In practice, this is done by evenly or randomly selecting some numbers between two successive original counting numbers as new counting numbers for the light emitting signal F42. Thus, the equivalent frequency corresponding to any two successive impulses of an updated light emitting signal F42 generated by the controller 503 according to updated counting numbers is greater than a second preset value of 60 Hz, which is an acceptable flicker rate.

In this embodiment as shown by the lower wave in FIG. 4, t51 (133), t52 (143), t53 (166), and t54 (176) are the new counting numbers selected by the controller 503 corresponding to the two inserted impulses P51 and P52. Thus, the frequency of the updated light emitting signal F42 generated by the controller 503 according to the updated counting numbers is increased to 90 Hz. Additionally, the equivalent frequency corresponding to any two successive impulses of the updated light emitting signal F42 is 90 Hz, greater than the second preset value, 60 Hz.

The photo sensor unit 504 executes the capture operation according to the impulses P411 and P412 of the capture signal F41 as shown in the upper wave in FIG. 4. Similarly, the light emitting unit 505 executes the light emitting operation according to the impulses P421, P51, P52, and P422 of the light emitting signal F42 as shown by the lower wave in FIG. 4. In the upper wave, when the counting number presently generated by the counter 502 is t41 (100) or t43 (200), the voltage level of the capture signal F41 switches from LOW to HIGH, and the photo sensor unit 504 executes at least one capture operation. When the counting number presently generated by the counter 502 is t42 (120) or t44 (220), the voltage level of the capture signal F41 switches from HIGH to LOW, and the photo sensor unit 504 stops the capture operation. Similarly, in the lower wave, when the counting number presently generated by the counter 502 is t41 (100), t51 (133), t53 (166), or t43 (200), the voltage level of the light emitting signal F42 switches from LOW to HIGH, and the light emitting unit 505 executes at least one light emitting operation. When the counting number presently generated by the counter 502 is t42 (120), t52 (143), t54 (176), or t44 (220), the voltage level of the light emitting signal F42 switches from HIGH to LOW, and the light emitting unit 505 stops the light emitting operation.

Second Embodiment

Figure 5:
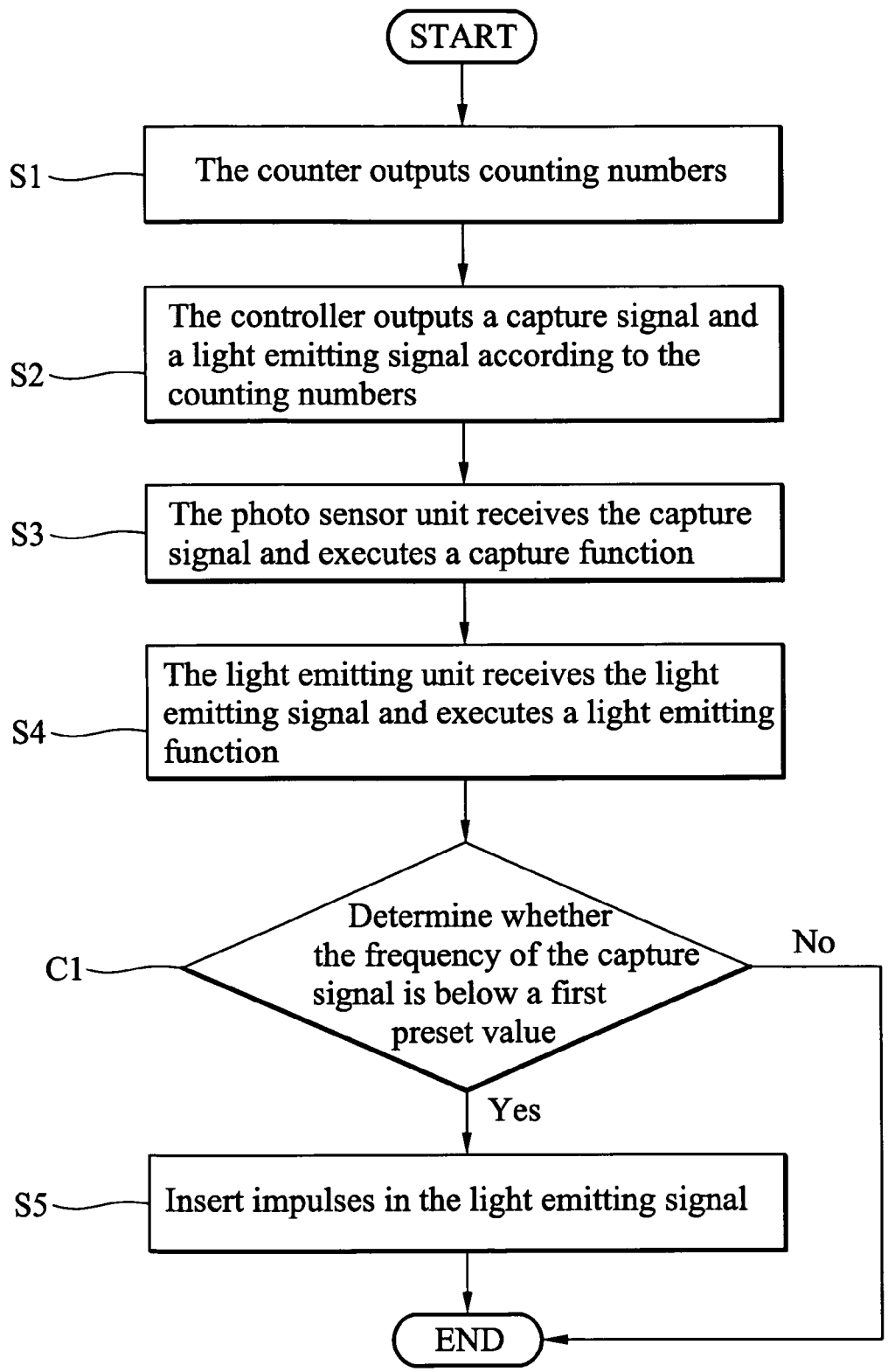
FIG. 5 is a process chart of the light control method of the present invention.

FIG. 5 is a process chart of the light control method of the present invention. For simplicity, description of FIGS. 3 and 4 of the first embodiment are omitted. The optical mouse comprises a processing unit 501, a photo sensor unit 504, and a light emitting unit 505. The light emitting unit 505 is an LED. The processing unit 501 comprises a counter 502 and a controller 503.

In step S1, the counter 502 sequentially generates counting numbers T for transmission to the controller 503. The counting numbers T are increased from 0 to 3000 by increments of 1 in one second for use as a time division standard. In step S2, the controller 503 generates a capture signal F41 and a light emitting signal F42 according to two selected sets of counting numbers respectively. The capture signal F41 and the light emitting signal F42 are output to the photo sensor unit 504 and the light emitting unit 505 respectively. When a counting number presently generated by the counter 502 belongs to the selected set of counting numbers, the controller 503 outputs one impulse.

In step S3, the photo sensor unit 504 executes at least one capture operation according to the impulse of the capture signal F41. In step S4, the light emitting unit 505 executes a light emitting operation according to the impulse of the light emitting signal F42. Note that because the light emitting unit 505 operates in coordination with the photo sensor unit 504, the selected set of counting numbers for the light emitting signal F42 must comprise all numbers in the selected set of counting numbers for the capture signal F41, such that the light emitting unit 505 executes the light emitting operation each time when the photo sensor unit 504 executes the capture operation.

Next, in the conditional C1, the controller 503 detects whether the frequency of the capture signal F41 is less than a first preset value, 60 Hz. There are two cases here. First, when the optical mouse is in a normal mode, for example being moved, the controller 503 selects all multiples of 2 as the selected set of counting numbers to generate the capture signal F41. The counting numbers T generated by the counter 502 are increased from 0 to 3000 by increments of 1 in one second. Thus, the frequency of the capture signal F41 is 1500 Hz, greater than the first preset value, 60 Hz, so the process ends. It is noted here that in practice the controller 503 uses the same numbers as each selected set of counting numbers to generate the capture signal F41 and the light emitting signal F42. Thus, the capture signal F41 and the light emitting signal F42 have the same frequency value. Therefore, the light emitting unit 505 executes the light emitting operation each time the photo sensor unit 504 executes the capture operation.

Second, when the optical mouse is in a standby mode, for example being left idle for some duration, the two selected sets of counting numbers comprise different numbers. The selected set of counting numbers for the capture signal F41 is determined so as to decrease the frequency of the capture signal F41 to be 30 Hz for reducing power consumption. As shown by the upper wave in FIG. 4, the counting numbers T corresponding to the capture signal F41 are t41 (100), t42 (120), t43 (200), and t44 (220).

Because the frequency of the capture signal F41, 30z, is less than a first preset value, 60 Hz, the conditional C1 is true, and the process goes to step S5. It is noted here that the light emitting unit 505 must operate in coordination with the photo sensor unit 504, thus the counting numbers T corresponding to the capture signal F41, t41, t42, t43, and t44, are also used to generate the light emitting signal F42. For convenience, those counting numbers t41, t42, t43, and t44 are referred to as original counting numbers for the light emitting signal F42 hereinafter.

In step S5, the controller 503 inserts two impulses P51 and P52 between two successive impulses P421 and P422 of the light emitting signal F42 as shown in FIG. 4. In practice, this is done by evenly or randomly selecting some numbers between two successive original counting numbers as new counting numbers for the light emitting signal F42. Thus, the equivalent frequency corresponding to any two successive impulses of an updated light emitting signal F42 generated by the controller 503 according to updated counting numbers is greater than a second preset value, 60 Hz, which is an acceptable flicker rate.

In this embodiment as shown in the lower wave in FIG. 4, t51 (133), t52 (143), t53 (166), and t54 (176) are the new counting numbers selected by the controller 503 corresponding to the two inserted impulses P51 and P52. Thus, the frequency of the updated light emitting signal F42 generated by the controller 503 according to the updated counting numbers is increased to 90 Hz. Additionally, the equivalent frequency corresponding to any two successive impulses of the updated light emitting signal F42 is 90 Hz, greater than the second preset value, 60 Hz. The process ends after the step S5 is executed.

It is noted here that the photo sensor unit 504 executes the capture operation according to the impulses P411 and P412 of the capture signal F41 as shown by the upper wave in FIG. 4. Similarly, the light emitting unit 505 executes the light emitting operation according to the impulses P421, P51, P52, and P422 of the light emitting signal F42 as shown in the lower wave in FIG. 4. In the upper wave, when the counting number presently generated by the counter 502 is t41 (100) or t43 (200), the voltage level of the capture signal F41 switches from LOW to HIGH, and the photo sensor unit 504 executes at least one capture operation. When the counting number presently generated by the counter 502 is t42 (120) or t44 (220), the voltage level of the capture signal F41 switches from HIGH to LOW, and the photo sensor unit 504 stops the capture operation. Similarly, in the lower wave, when the counting number presently generated by the counter 502 is t41 (100), t51 (133), t53 (166), or t43 (200), the voltage level of the light emitting signal F42 switches from LOW to HIGH, and the light emitting unit 505 executes at least one light emitting operation. When the counting number presently generated by the counter 502 is t42 (120), t52 (143), t54 (176), or t44 (220), the voltage level of the light emitting signal F42 switches from HIGH to LOW, and the light emitting unit 505 stops the light emitting operation.

In summary, when the photo sensor unit operates at a low frequency, the frequency of the light emitting unit can be adjusted accordingly to be greater than an acceptable flicker rate, thus avoiding perceptible flickers, reducing power consumption, and prolonging life of the light emitting unit.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light control module, appropriate for an optical pointing device, comprising:
    a processing unit outputting a first signal and a second signal;
    a photo sensor unit executing a capture operation according to an impulse of the first signal; and
    a light emitting unit executing a light emitting operation according to an impulse of the second signal;
    wherein when a frequency value of the first signal is less than a first preset value, at least one impulse is inserted between two successive impulses of the second signal for adjusting a frequency value of the second signal such that an equivalent frequency value corresponding to any two successive impulses of the second signal is greater than a second preset value, thus rendering flickers of the light emitting unit imperceptible.

2. The light control module as claimed in claim 1, wherein the optical pointing device is an optical mouse.

3. The light control module as claimed in claim 1, wherein the processing unit comprises:
   a counter outputting a counting number; and
   a controller outputting the first signal and the second signal according to the counting number.

4. The light control module, as claimed in claim 1, wherein the first preset value is equal to the second preset value.

5. The light control module as claimed in claim 4, wherein the first preset value is 60 Hz and the second preset value is 60 Hz.

6. A light control method, appropriate for an optical pointing device, comprising the steps of:
   outputting a first signal and a second signal;
   executing a capture operation according to an impulse of the first signal;
   executing a light emitting operation according to an impulse of the second signal;
   determining whether a frequency value of the first signal is less than a first preset value; and
   if so, inserting at least one impulse between two successive impulses of the second signal for adjusting a frequency value of the second signal such that an equivalent frequency value corresponding to any two successive impulses of the second signal is greater than a second preset value, thus rendering flickers of light imperceptible.

7. The light control method as claimed in claim 6, wherein the optical pointing device is an optical mouse.

8. The light control method as claimed in claim 6, wherein the step of outputting a first signal and a second signal comprises the steps of:
   outputting a counting number; and
   outputting the first signal and the second signal according to the counting number.

9. The light control method as claimed in claim 6, wherein the first preset value is equal to the second preset value.

10. The light control method as claimed in claim 9, wherein the first preset value is 60 Hz and the second preset value is 60 Hz.

* * * * *